United States Patent
Baba

(10) Patent No.: US 6,216,198 B1
(45) Date of Patent: Apr. 10, 2001

(54) CACHE MEMORY ACCESSIBLE FOR CONTINUOUS DATA WITHOUT TAG ARRAY INDEXING

(75) Inventor: Seiji Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/148,783

(22) Filed: Sep. 4, 1998

(30) Foreign Application Priority Data

Sep. 4, 1997 (JP) .................................................. 9-239792

(51) Int. Cl.[7] .................................................... G06F 12/08
(52) U.S. Cl. ................................ 711/3; 711/118; 711/128; 707/100
(58) Field of Search ............................. 711/3, 108, 118, 711/125, 126, 128, 132, 137, 144, 154; 707/100

(56) References Cited

U.S. PATENT DOCUMENTS 5,649,144 * 7/1997 Gostin et al. ........................ 711/137
5,717,916 * 2/1998 Verma ...................................... 707/7
5,909,704 * 6/1999 Ireland ................................. 711/218

* cited by examiner

Primary Examiner—Do Yoo
Assistant Examiner—Yamir Encarnación
(74) Attorney, Agent, or Firm—McGinn & Gibb, PLLC

(57) ABSTRACT

A tag array includes, corresponding to each line, backward and forward links for holding line numbers for storing adjacent data included in continuous data. For storing the continuous data in the tag array and a data array, backward and forward links are generated by holding beforehand storing line numbers used immediately before. For reading the continuous data from the tag array and the data array, by holding beforehand the content of a forward link in a line accessed immediately before, a number of a line for storing next data in the continuous data is specified without indexing a cache memory.

20 Claims, 5 Drawing Sheets

| V1 | B1 | F1 | TAG1 | V2 | B2 | F2 | TAG2 |
|---|---|---|---|---|---|---|---|
| 0 | 0 | 0 | ADR11 | 1 | 0 | 0 | ADR12 |
| 1 | 0 | 0 | ADR21 | 1 | 0 | 0 | ADR22 |
| 0 | 0 | 0 | ADR31 | 0 | 0 | 0 | ADR32 |
| 1 | 0 | 2 | ADR41 | 0 | 0 | 0 | ADR42 |
| 0 | 0 | 0 | ADR51 | 1 | 1 | 1 | ADR52 |
| 1 | 2 | 1 | ADR61 | 0 | 0 | 0 | ADR62 |
| 1 | 1 | 0 | ADR71 | 0 | 0 | 0 | ADR72 |
| 0 | 0 | 0 | ADR81 | 0 | 0 | 0 | ADR82 |
| 1 | 0 | 0 | ADR91 | 0 | 0 | 0 | ADR92 |
| | | | ⋮ | | | | ⋮ |

FIG. 2

CACHE MEMORY ACCESSIBLE FOR CONTINUOUS DATA WITHOUT TAG ARRAY INDEXING

BACKGROUND OF THE INVENTION

The present invention relates to a cache memory, and more particularly one for storing continuous data.

In a conventional cache memory, an address (tag) array is indexed (retrieved) for each access made from a processor to a cache memory and then making determination as to its registration (hit/miss-hit) in the cache memory. However, this conventional technology makes no classification of data registered in the cache memory and treats the data independently. Accordingly, no consideration is given to any relationship even if any relationship exists between data, and the determination of hit/miss-hit in the cache memory must be performed each time.

Some of the conventional cache memories pay particular attention to locality of address location of programs and operands executed by a processor. Thus, such a cache memory has employed a control system which retrieves, if data requested to be fetched by the processor hits the cache memory, a block next to the block thereof and pre-fetches, if the data miss-hits the cache memory, to a main storage unit.

However, the foregoing conventional technology is disadvantageous in that the necessity of hit/miss-hit determination carried out each time makes it difficult to perform high-speed accessing for reading continuous data.

SUMMARY OF THE INVENTION

In view of the foregoing problem of the conventional system, an object of the present invention is to provide a cache memory, which registers continuous data as such when the same is registered in the cache memory and thereby enables high-speed access to be made to the continuous data without retrieving a tag array when the same is read.

In a cache memory according to a first aspect of the present invention, the cache memory holds at least one of a forward and backward relationship between adjacent data included in continuous data.

With the unique and unobvious structure of the present invention, line numbers are provided without indexing a cache memory during accessing to continuous data.

BRIEF DESCRIPTION OF THE DRAWINGS

The above-mentioned and other objects, features and advantages of this invention will become more apparent by reference to the following detailed description of the invention taken in conjunction with the accompanying drawings in which:

FIG. 2 is a view showing a structure of a tag array of the embodiment of the invention;

DETAILED DESCRIPTION OF THE PREFERRED EMBODIMENT

A cache memory in accordance with a preferred embodiments of the present invention will be described in detail with reference to the accompanying drawings.

Figure 1:
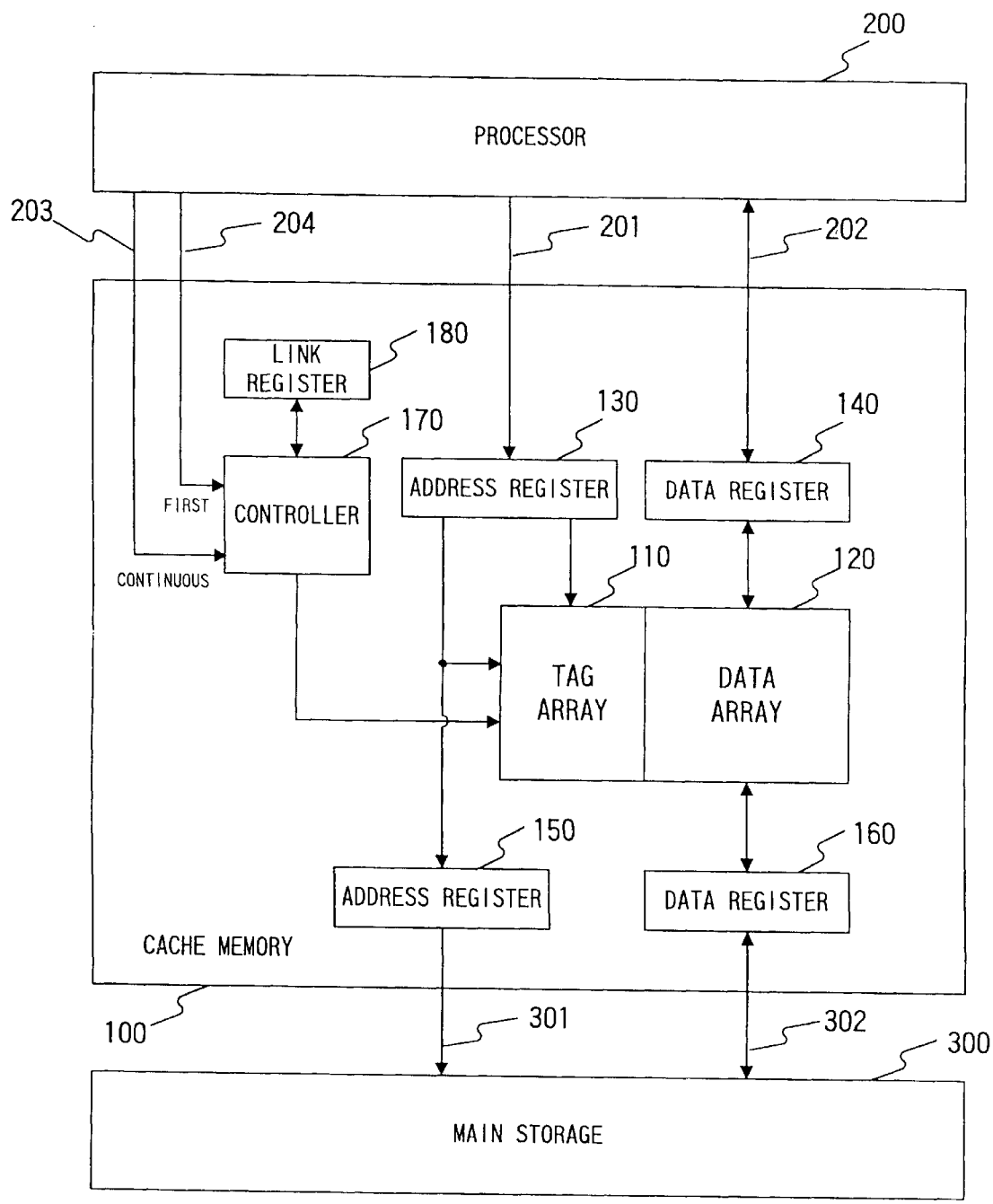
FIG. 1 is a block diagram showing the configuration of a cache memory according to an embodiment of the present invention.

Referring to FIG. 1, an embodiment of the present invention is constituted so that a cache memory 100 is connected between a processor 200 and a main storage 300. The processor 200 outputs an address to a signal line 201 during data reading. If cache hit is determined, then the cache memory 100 outputs data to a signal line 202. On the other hand, if cache miss-hit is determined, the cache memory 100 outputs an address to a signal line 301. Upon having received this address, the main storage 300 outputs data to a signal line 302. The output data is then returned through the signal line 202 to the processor 200.

The cache memory 100 includes a tag array 110, a data array 120, an address register 130 for holding an address from the processor 200, a data register 140 for holding data from the processor 200, an address register 150 for holding an address from the main storage 300, a data register 160 for holding data from the main storage 300, a control circuit 170 for controlling the cache memory 100 and a link register 180 for holding a previously accessed line number.

The embodiment assumes a two-way set associative type cache memory for convenience of explanation. However, the present invention can generally be applied to an N-way set associative type (N>1; N is an integer) cache memory.

Each entry of the tag array 110 corresponds to each entry of the data array 120, and a part of an address is held as a tag. The cache memory 100 is a two-way set associative type as described above, and thus each set includes two groups of tags. Each data managed by each tag is called a line.

The processor 200 asserts a continuous data signal line 203 for reading continuous data. For reading first data included in the continuous data, the processor 200 asserts a first data signal line 204. The control circuit 170 performs cache memory control by referring to the continuous data signal line 203 and the first data signal line 204. The link register 180 holds a number of a previously accessed line (i.e., backward data included in the continuous data) for accessing the continuous data.

According to the present invention, "continuous data" means a series of data, for instance a character string. For example, in the case of an English character string containing three characters of "NEC", first data is "N", second data is "E", and last data is "C". It is assumed, hereinafter, that such continuous data is stored in the different continuous sets of the cache memory.

Referring now to FIG. 2, the tag array 110 is shown to hold two groups of tags (TAG 1 & TAG 2) for each set. The tags respectively include valid bits (V1, V2), backward links (B1, B2) and forward links (F1, F2).

Each valid bit indicates validity/invalidity of a corresponding tag. For example, if V1 is "1", then a corresponding tag or data is valid. If V1 is "0", then a corresponding tag or data is not valid.

Each backward link indicates in which line of continuous data in a previous set is stored. For example, if B1 is "2", it means that a second line has stored data immediately before. If B1 is "0", it means that the backward link B1 to the previous set indicates nothing ("null").

Each forward link indicates in which line of the continuous data in a subsequent set is stored. For example, if F1 is "1", it means that a first line has stored next data. If F1 is "0", it means that the forward link F1 to the subsequent set indicates nothing ("null").

If both a backward link and a forward link in the same set are "0", it means that data in the set is single (independent) data (not included in continuous data). If a backward link is "0" and a forward link in the same set is not "0", it means that data in the set is the first data in continuous data. If a forward link is "0" and a backward link in the same set is not "0", it means that data in the set is the last data in continuous data.

More specifically, in the example of FIG. 2, concerning the entry of an address 21, since V1 is "1", this address 21 is valid. Also, since B1 and F1 are "0", corresponding data is single data. Concerning an address 32, since V2 is "0", this address 32 is not valid.

Figure 3:
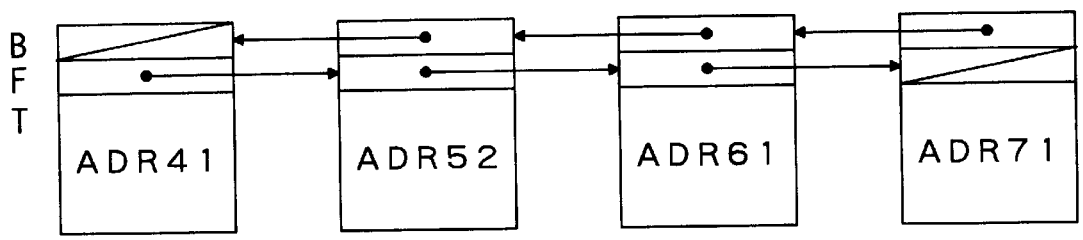
FIG. 3 is a view showing a structure of continuous data of the embodiment of the invention.

Referring to FIGS. 2 and 3, four data regarding addresses 41, 52, 61 and 71 are shown to constitute continuous data. Specifically, concerning the address 41, since B1 is "0" and F1 is "2", data corresponding to the address 41 is first data of the continuous data, and next data has been stored in the second line of the next set. Concerning the address 52 of the second line of the next set, since B2 is "1" and F2 is "1", data corresponding to the address 52 is middle data of the continuous data, and previous data has been stored in the first line of the previous set and next data has been stored in the first line of the next set. Similarly, concerning the address 61 of the first line of the next set, since B1 is "2" and F1 is "1", data corresponding to the address 61 is middle data of the continuous data, and previous data has been stored in the second line of the previous set and next data has been stored in the first line of the next set. Concerning the address 71 of the next set, since B1 is "1" and F1 is "0", data corresponding to the address 71 is the last data of the continuous data, and previous data has been stored in the first line of the previous set.

Next, an operation of the embodiment of the present invention will be described.

Figure 4:
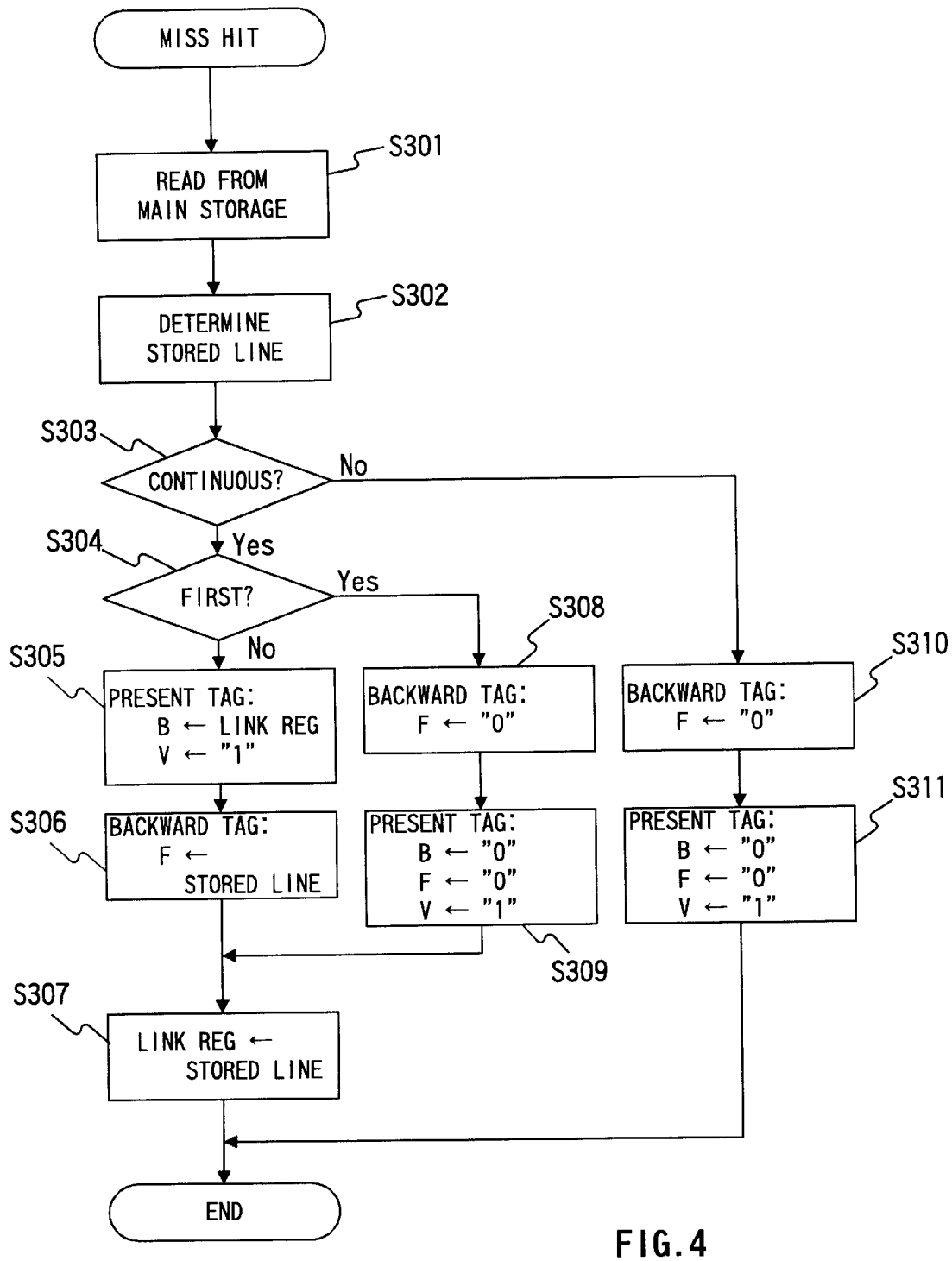
FIG. 4 is a view showing a miss-hit time operation of the embodiment of the invention.

Referring to FIGS. 1 and 4, explanation will be made of an operation which is performed if miss-hit occurs when access is made from the processor 200 to the cache memory 100. The following operation is carried out under the control of the control circuit 170.

If miss-hit occurs in the cache memory 100, the cache memory 100 accesses the main storage 300 for reading data (step S301). Then, for the data read from the main storage 300, to which set the data should be stored is decided according to its address. Also, by a predetermined method, to which line the data should be stored is decided (step S302). For such a method, for example, an LRU (Least Recently Used) method for throwing out data not accessed for a long time and storing new data in its line has been known. A line decided in the foregoing manner will be called "storing line", hereinafter.

If the continuous data signal line 203 is asserted during accessing from the processor 200 (step S303), then whether the first data signal line 204 is also asserted or not is determined (step S304). If no asserting of the continuous data signal line 203 is determined in step S303, it means that access is to single data. Accordingly, by tracing the backward link in the line of the thrown-out data, the forward link in the backward tag is set to "0" (step S310). Subsequently, in the line of the thrown-out data (i.e., storing line), the valid bit is set to "1" and the backward and forward links are set to "0" (step S311). These processes are necessary for maintaining inter-data matching so as to prevent inconsistency from being produced even if single data is substituted for the middle data of the continuous data.

In step S304, if asserting of the first data signal line 204 is determined, it means that access is to the first data of the continuous data. Accordingly, as in the case of the single data, by tracing the backward link in the storing line, the forward link in the backward tag is set to "0" (step S308). Subsequently, in the storing line, the valid bit is set to "1" and the backward and forward links are set to "0" (step S309).

In step S304, if no asserting of the first data signal line 204 is determined, it means that access is to the middle data of the continuous data. Accordingly, in the storing line, the valid bit is set to "1" and the content of the link register 180 is stored in the backward link (step S305). As described above, the link register 180 holds a line number for storing data backward by one of the continuous data. Based on the line number, a backward line is specified and a storing line number is stored for the forward link in the backward line (step S306).

If asserting of the continuous data signal line 203 is determined in step S303, then a number of a storing line is held in the link register 180 (step S307).

The foregoing miss-hit processing is performed primarily for reading access. But the miss-hit processing can be performed similarly for writing access.

Figure 5:
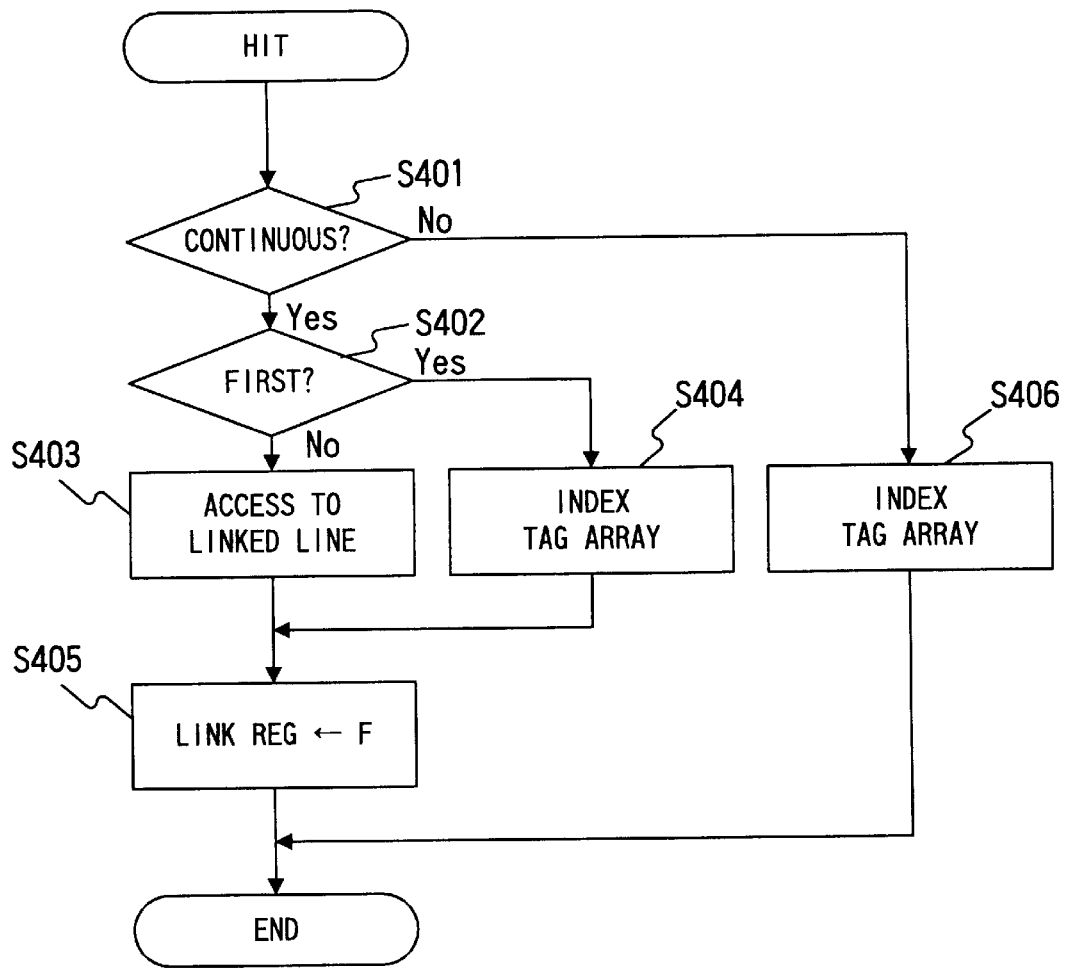
FIG. 5 is a view showing a hit time operation of the embodiment of the invention.

Now, by referring to FIGS. 1 and 5, an operation performed when a cache hit of access from the processor 200 to the cache memory 100 is determined will be described. The following operation is carried out under the control of the control circuit 170.

If the continuous data signal line 203 is asserted during accessing from the processor 200 (step S401), then determination is made as to asserting of the first data signal line 204 (step S402). If no asserting of the continuous data signal line 203 is determined in step S401, it means that access is to single data. Accordingly, normal retrieving of the cache memory is performed (step S406).

If asserting of the first data signal line 204 is determined in step S402, it means that no access was made to the continuous data at the previous time. Accordingly, normal retrieving of the cache memory is performed (step S406). If no asserting of the first data signal line 204 is determined, then access is made to the data array 120 according to the line number held in the link register 180 (step S403).

If asserting of the continuous data signal line 203 is determined in step S401, the content of the forward link in the currently accessed storing line is held in the link register 180 (step S405).

The foregoing hit processing is performed primarily for reading access. But the hit processing can be performed similarly for writing access.

According to the embodiment of the present invention, line numbers for storing adjacent data included in the continuous data are stored beforehand in the forward and backward links of the tag array 110. Thus, the line numbers can be defined without indexing the cache memory during accessing to the continuous data.

As apparent from the foregoing, the present invention is advantageous in that since line numbers can be defined without indexing a cache memory during accessing to continuous data, access can be made to the cache memory at a high-speed.

While the invention has been described in terms of a preferred embodiment, those skilled in the art will recognize that the invention can be practiced with modification within the spirit and scope of the appended claims.

What is claimed is:

1. A cache memory which holds, for each continuous data, at least one of a forward relationship and a backward relationship between adjacent data included in said each continuous data, wherein said cache memory includes a tag array, wherein a line number of each conti uous data is definable such that each continuous data is accessed without indexing said tag array of the cache memory during accessing to the continuous data, and wherein the cache memory receives a continuous data signal.

2. The cache memory of claim 1, wherein said cache memory comprises a two-way set associative type cache memory.

3. The cache memory of claim 2, wherein said tag array holds first and second groups of tags for each set.

4. The cache memory of claim 3, wherein said tags in said tag array include a valid bit, a backward link representing any said backward relationship, and a forward link indicating any said forward relationship.

5. A cache memory, comprising:

a tag array which includes at least two lines; and a data array corresponding to said tag array, wherein, for each continuous data, said tag array includes, for each of said lines, a backward link indicating a number of a line for storing backward data included in corresponding continuous data, and a forward link indicating a number of a line for storing forward data included in said corresponding continuous data, wherein a line number of each continuous data is definable such that each continuous data is accessed without indexing said tag array of the cache memory during accessing to the continuous data, wherein the cache memory receives a continuous data signal.

6. A cache memory according to claim 5, further comprising:

a control circuit for setting, when data with respect to a cache miss-hit read from a main storage is stored, if data to be accessed is a first data in said continuous data, a backward link of its storing line to a null data, and setting, if said data to be accessed is data other than said first data included in said continuous data, a backward link of its storing line to indicate a previously accessed backward line and a forward link of said backward line to indicate said storing line.

7. A cache memory according to claim 5, further comprising:

a link register for holding, when said continuous data in said cache memory is stored, a previously accessed line number which indicates a content of a backward link in a line used for next accessing to said continuous data.

8. A cache memory according to claim 7, further comprising:

a control circuit for setting, when data from a main storage with respect to a cache miss-hit is stored, if data to be accessed is first data in said continuous data, a backward link of its storing line to a null data, and setting, if said data to be accessed is data other than said data included in said continuous data, a content of said link register in a backward link of its storing line and a forward link of its backward line to indicate said storing line.

9. A cache memory according to claim 5, further comprising:

a link register for holding, when said continuous data from said cache memory is read, a content of a previously accessed line's forward link which indicates a line number for next accessing to said continuous data.

10. A cache memory according to claim 9, further comprising:

a control circuit for performing control so as to index, when data from said cache memory with respect to a cache hit is read, if data to be accessed is a first data in said continuous data, said cache memory and access, if said data to be accessed is data other than said data included in said continuous data, a line indicated by said link register.

11. A cache memory according to claim 5, further comprising:

a link register for holding, when said continuous data in said cache memory is stored, a number of a previously accessed line and indicating a content of a backward link in a line used for next accessing to said continuous data, and holding, when said continuous data from said cache memory is read, a content of a previously accessed line's forward link which indicates a number of a line used for next accessing to said continuous data.

12. The cache memory of claim 5, wherein said cache memory comprises a two-way set associative type cache memory.

13. The cache memory of claim 12, wherein said tag array holds first and second groups of tags for each set.

14. The cache memory of claim 13, wherein said tags in said tag array include a valid bit, a backward link representing any said backward relationship, and a forward link indicating any said forward relationship.

15. A continuous data storing method in a cache memory including a tag array, a data array corresponding to said tag array and a link register for holding a number of a previously accessed line for continuous data, said tag array including, for each continuous data, a backward link indicating a number of a line for storing backward data included in corresponding continuous data and a forward link indicating a number of a line for storing forward data included in said corresponding continuous data, said continuous data storing method comprising:

invalidating, if data to be accessed comprises a first data included in the continuous data, a backward link in its storing line; and storing, if data to be accessed comprises data other than said first data included in said continuous data, a content of said link register in a backward link of its storing line and a number of its storing line in a forward link of a line indicated by said link register, wherein a line number of each continuous data is definable such that each continuous data, is accessed without indexing said tag array of the cache memory during accessing to the continuous data, wherein the continuous data is stored when a continuous data signal is asserted.

16. The method of claim 15, wherein said cache memory comprises a two-way set associative type cache memory, and said tag array holds first and second groups of tags for each set.

17. The method of claim 16, tags in said tag array include a valid bit, a backward link representing any said backward relationship, and a forward link indicating any said forward relationship.

18. A continuous data reading method in a cache memory, said cache memory including a tag array, a data array corresponding to said tag array, said tag array including, for each continuous data, a backward link indicating a number of a line for storing backward data included in corresponding continuous data and a forward link indicating a number of a line for storing forward data included in said corresponding continuous data, and a link register for holding a content of said forward link in a previously accessed line, said continuous data reading method comprising:

retrieving said cache memory if data to be accessed comprises a first data included in the continuous data; and accessing a line indicated by said link register if data to be accessed comprises data other than said first data included in said continuous data, wherein a line number of each contiuous data is definable such that each continuous data is accessed without indexing said tag array of the cache memory during accessing to the continuous data, wherein the continuous data is read when a continuous data signal is asserted.

19. The method of claim 18, wherein a cache memory comprises a two-way set associative type cache memory, and said tag array holds first and second groups of tags for each set.

20. The method of claim 19, wherein said tags in said tag array include a valid bit, a backward link representing any said backward relationship, and a forward link indicating any said forward relationship.

\* \* \* \* \*